United States Patent [19]

Tanaka

[11] Patent Number: 4,730,908

[45] Date of Patent: Mar. 15, 1988

[54] ZOOM LENS

[75] Inventor: Kazuo Tanaka, Tokyo, Japan

[73] Assignee: Canon Kabushiki Kaisha, Tokyo, Japan

[21] Appl. No.: 743,378

[22] Filed: Jun. 11, 1985

[30] Foreign Application Priority Data

Jun. 15, 1984 [JP] Japan ................................ 59-123153

[51] Int. Cl.$^4$ ............................................. G02B 15/14
[52] U.S. Cl. .................................. 350/427; 350/423
[58] Field of Search ................................ 350/423, 427

[56] References Cited

U.S. PATENT DOCUMENTS 4,437,732 3/1984 Ishiyama ............................ 350/427

FOREIGN PATENT DOCUMENTS 28051 2/1980 Japan .

Primary Examiner—John K. Corbin
Assistant Examiner—P. M. Dzierzynski
Attorney, Agent, or Firm—Fitzpatrick, Cella, Harper & Scinto

[57] ABSTRACT

A zoom lens comprises, in succession from the object side to the image side, a positive first lens group movable for focusing, a negative second lens group movable for zooming, a positive third lens group movable for zooming, a negative fourth lens group movable for zooming and moved with the second lens group, and a stationary fifth lens group. When $\beta_i$ is the lateral magnification of the ith lens group as counted from the object side, the lateral magnification of each of the lens groups satisfies at a point in zooming $$\beta_2<0, \beta_4<0, \beta_2\beta_4=1, \beta_3=-1$$

and satisfies at the point $$-1.3<\beta_2<-1.025.$$

3 Claims, 16 Drawing Figures

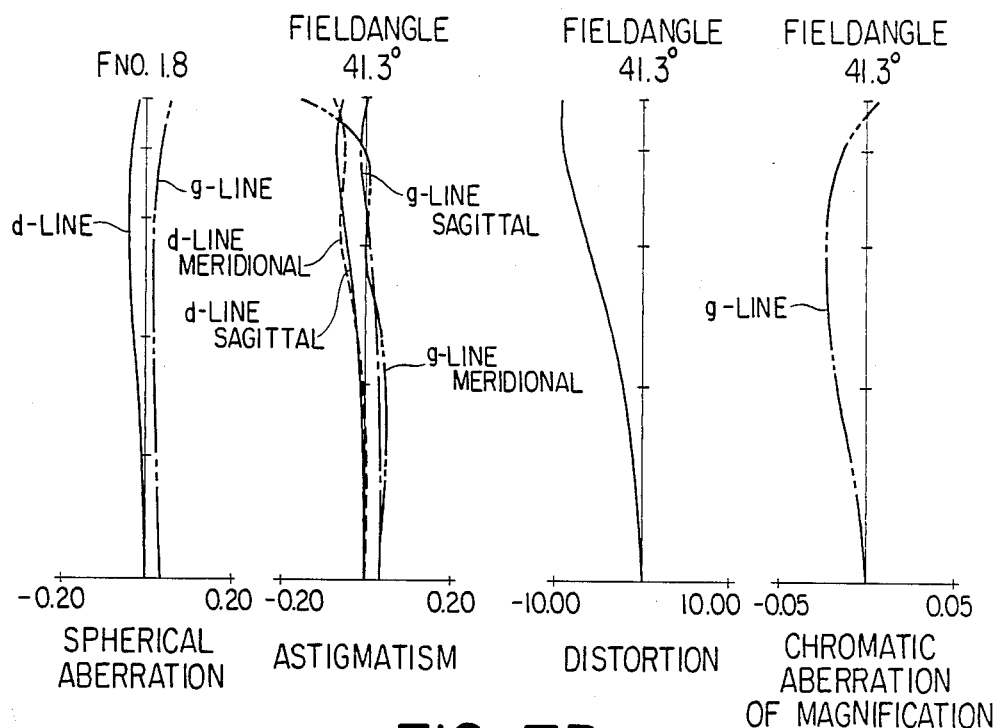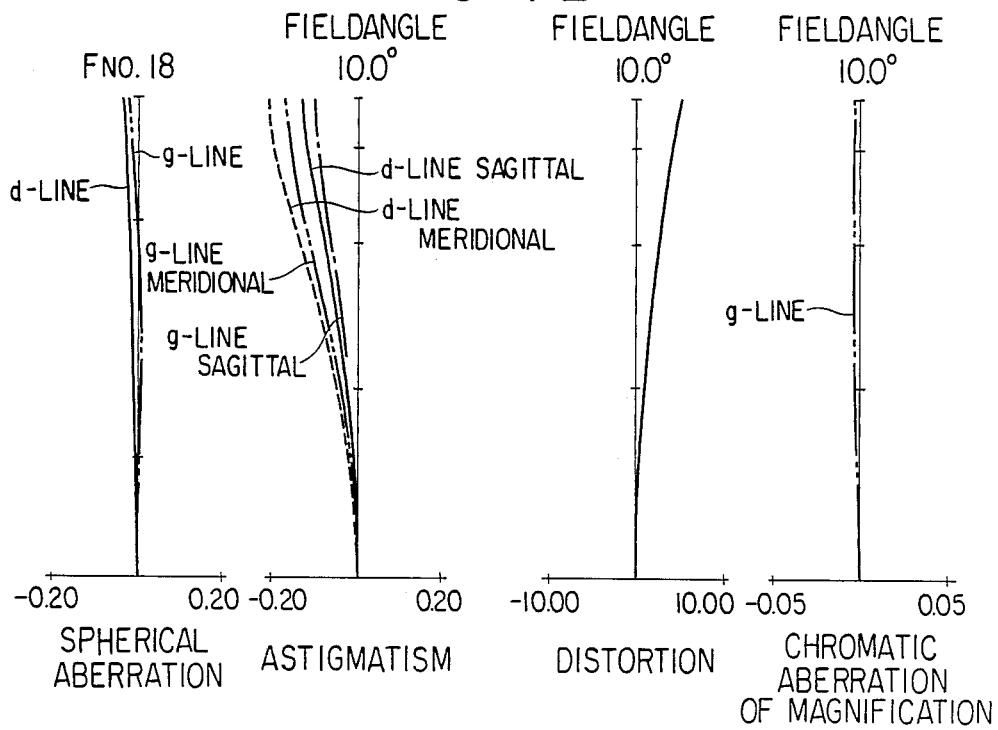

ZOOM LENS

BACKGROUND OF THE INVENTION

1. Field of the Invention

This invention relates to a zoom lens used for the image pickup by a video camera, a film camera or the like.

2. Description of the Prior Art

A mechanical correction type zoom lens in which two independent lens groups are movable during zooming generally has two separate integral curves and effects zooming by the lens groups being moved along one of the integral curves. However, in a special zoom lens, for example, a zoom lens shown in Japanese Laid-open Patent Appln. No. 29658/1979 or Japanese Laid-open Patent Appln. No. 29659/1979, zooming is effected by causing said two integral curves to intersect each other and causing the lens group moved along one of the integral curves to change onto the other integral curve at the point of intersection between the integral curves.

In Japanese Laid-open Patent Appln. No. 28051/1980, in a mechanical correction type zoom lens which comprises, in succession from the object side to the image side, a first lens group for focusing, second, third and fourth lens groups movable for zooming and a fifth lens group as a relay lens and in which the second lens group and the fourth lens group are moved together during zooming, the following conditions are disclosed as the conditions under which the lens groups change from one integral curve onto the other integral curve during zooming:

$$|\beta_2 \cdot \beta_4| = |\beta_3| = 1 \tag{1}$$

$$\text{Hessian:} \begin{vmatrix} \frac{\partial Z}{x_1^2} & \frac{\partial Z}{x_1 \cdot x_2} \\ \frac{\partial Z}{x_1 \cdot x_2} & \frac{Z}{x_2} \end{vmatrix} < 0 \tag{2}$$

where $\beta_i$ is the lateral magnification of the ith lens group, Z is an equation which prescribes the zooming, $x_1$ is the amount of movement of the second lens group and the fourth lens group during zooming, and $x_2$ is the amount of movement of the third lens group during zooming.

SUMMARY OF THE INVENTION

It is an object of the present invention to provide a mechanical correction type zoom lens which permits a wider angle and a wider magnification as well as a compact construction.

In the mechanical correction type zoom lens according to the present invention, a positive first lens group movable for focusing, a negative second lens group movable for zooming, a positive third lens group movable for zooming, a negative fourth lens group movable for zooming and moved with the second lens group and a positive fifth lens group are disposed in succession from the object side to the image side and when $\beta_i$ is the lateral magnification of the ith lens group, the lateral magnification of each of the lens groups satisfies at a point in zooming $$\beta_2 < 0, \beta_4 < 0, \beta_2\beta_4 = 1, \beta_3 = -1$$

and satisfies at said point $$-1.3 < \beta_2 < -1.025,$$

thereby achieving the above object. The invention will hereinafter be described by reference to the accompanying drawings.

BRIEF DESCRIPTION OF THE DRAWINGS

FIGS. 7A, 7B and 7C show the various aberrations in the zoom lens shown in FIG. 6.

DESCRIPTION OF THE PREFERRED EMBODIMENT

Figure 1:
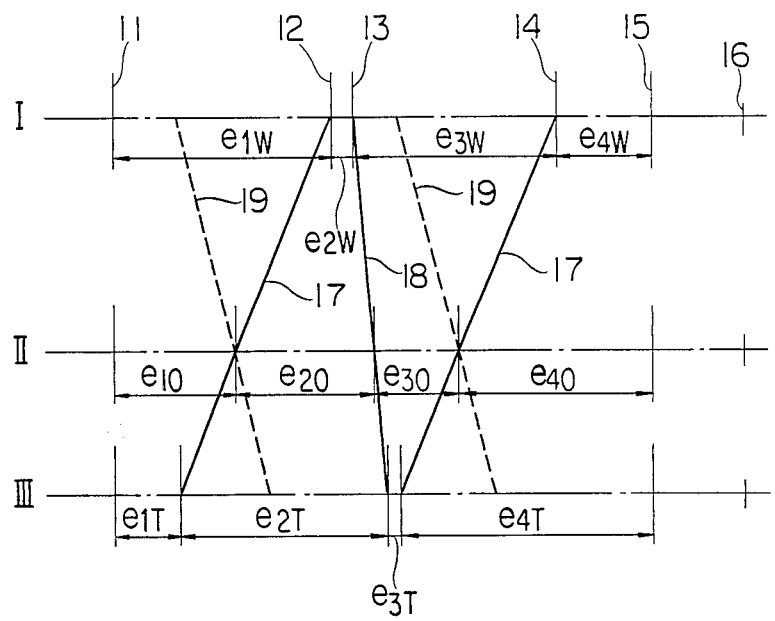
FIG. 1 shows the basic construction of a zoom lens according to the present invention.

Referring to FIG. 1 which shows the basic construction of a zoom lens according to the present invention, I designates the lens arrangement at the wide angle end, II denotes the lens arrangement at the change position, and III designates the lens arrangement at the telephoto end. As shown in FIG. 1, the zoom lens comprises, in succession from the object side to the image side, a first lens group 11 including a lens portion movable during focusing, three lens groups movable during zooming, i.e., a second lens group 12, a third lens group 13 and a fourth lens group 14, and a fifth lens group 15 which is always stationary. Reference numeral 16 designates the imaging plane. During the zooming from the wide angle end to the telephoto end, the second lens group 12 and the fourth lens group 14 are moved together from the image side to the object side as indicated by zooming locuses 17 and the third lens group 13 is moved from the object side to the image side as indicated by a zooming locus 18. Reference numeral 19 denotes other locuses different from the zooming locuses 17 of the second lens group 12 and the fourth lens group 14. Also, in FIG. 1, $e_{ij}$ indicates the spacing between the respective lens groups, the suffix i indicates the spacing between the ith lens group and the (i+1)th lens group, the suffix j indicates each zoom position, W indicates the wide angle end, T indicates the telephoto end, and O indicates the change position.

The zoom lens is constructed so that the first lens group (focusing portion) 11 has a positive refractive power, the second lens group 12 and the fourth lens group 14 have a negative refractive power, the third lens group 13 has a positive refractive power and the fifth lens group (relay portion) 15 has a positive or negative refractive power and that at a point in the course of zooming, the lateral magnification $\beta_i$ of each lens group satisfies $$\beta_2<0,\ \beta_4<0,\ \beta_2\beta_4=1,\ \beta_3=-1$$

and the lateral magnification of the second lens group at said point satisfies $$-1.3<\beta_2<-1.025.$$

$\beta_i$ indicates the lateral magnification of the ith lens group.

Here, the condition under which the zooming integral curve changes is considered. The general inscription of this condition is the aforementioned equations (1) and (2). Of these equations, the partial differential coefficient of equation (2) is specifically calculated and found. When the partial differential coefficient of each lens group is specifically calculated and found, if the refractive power of the ith lens group is $\phi_i$, finally the Hessian value $\Delta$ is $$\Delta=(\phi_2+\phi_4)\phi_3<0 \quad (3).$$

It is seen from this that the sign of the refractive powers of the second and fourth lens groups and the sign of the refractive power of the third lens group must be opposite to each other. Further, considering the wider angle which is one of the objects of the present invention, it is requisite that the first lens group which effects focusing has a positive refractive power in a practical manner and from these facts, it is derived that the refractive powers of the respective lens groups are positive, negative, positive and negative from the object side.

Equation (1) will now be considered. From the fact that the construction is the above-described positive, negative, positive and negative construction and that imaging must not occur in the interior of the zoom lens, it is necessary that the lateral magnifications of the lens groups of the zoom portion be all negative.

Accordingly, it is necessary that equation (1) be $$\beta_2<0,\ \beta_4<0,\ \beta_2\beta_4=1,\ \beta_3=-1 \quad (4).$$

Thus, at the change position, the lateral magnification of the third lens group 13 has been primarily determined to be $-1$, but as regards the lateral magnifications of the second lens group 12 and the fourth lens group 14, anything more than the fact that the product of the lateral magnifications of the two lens groups 12 and 14 is $+1$ is not judged, and a degree of freedom still exists here. The condition which prescribes this will be studied by the use of numerical values. The refractive powers $\phi_i$ of the respective lens groups are:

$$\phi_1=-1/35,\ \phi_2=1/30,\ \phi_3=-1/15,\ \phi_4=1/20 \quad (5).$$

If the spacing between the ith lens groups at the change position and the (i+1)th lens group is $e_{io}$, $$\begin{aligned} e_{10}&=(1-1/\beta_2)/\phi_2 \\ e_{20}&=(1-\beta_2)/\phi_2+2/\phi_3 \\ e_{30}&=2/\phi_3+(1-\beta_2)/\phi_4 \\ e_{40}&=TL-(e_{10}+e_{20}+e_{30}), \end{aligned} \quad (6)$$

where TL is the total length of the first lens group (focusing portion) and the second, third and fourth lens groups (zoom portion).

Figure 2:
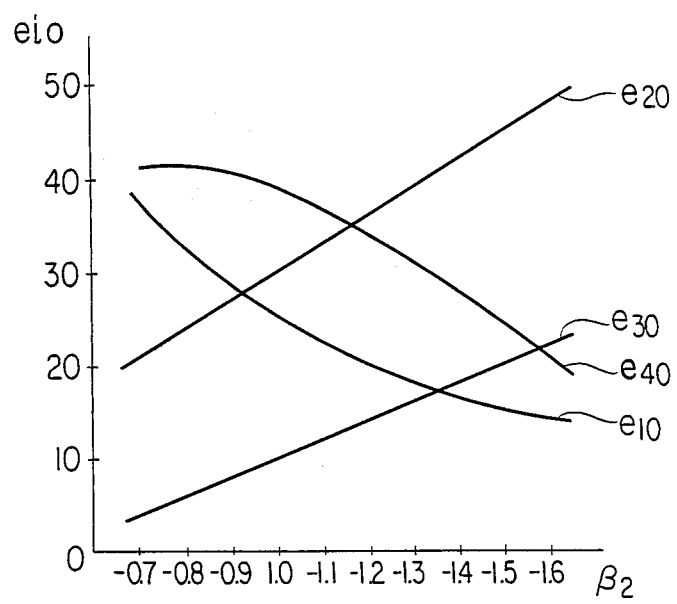
FIGS. 2, 3, 4 and 5 illustrate the requirements for the zoom lens of the present invention.

$\beta_2\beta_4=1$ and therefore, if the spacing $e_{io}$ between the respective lens groups at the change position indicated in the lens state II of FIG. 1 is to be found with $\beta_2$ as the parameter and by the use of equations (5) and (6), the result of FIG. 2 will be obtained. In FIG. 2, the abscissa represents the value of the parameter $\beta_2$ and the ordinate represents the value of the spacing $e_{io}$ between the lenses.

Figure 3:
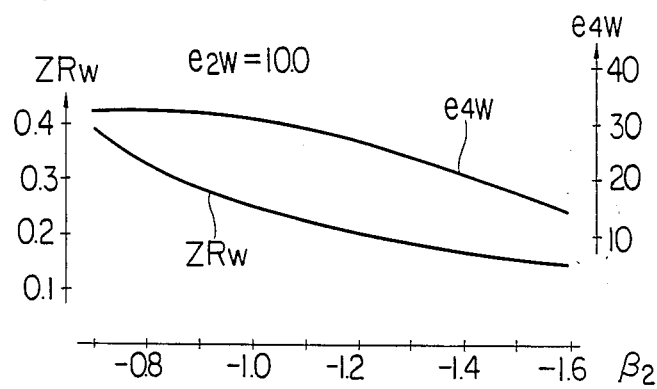

It will now be considered that, as shown at I and II of FIG. 1, the second lens group 12, the third lens group 13 and the fourth lens group 14 are moved from the change position to the short focus side and the long focus side to thereby effect zooming. As is apparent from I of FIG. 1 and FIG. 2, the spacing $e_{2w}$ between the second and third lens groups in the zoom portion becomes shortest at the shortest focal length, and this value determines the wide angle end. Also, at this time, it is necessary that the spacing $e_{4w}$ between the zoom portion (12, 13, 14) and the relay portion 15 be of a value which will not physically interfere. By the use of the aforementioned numerical values, with $e_{2w}$ at the wide angle end as 10 (a value which is the limit when the lens is made thick) and with $\beta_2$ as the parameter, $e_{4w}$ at the wide angle end and the zoom ratio ZRw which is the ratio of the focal lengths at the wide angle end and the change position are shown in FIG. 3. From this Figure, it is derived that to make the entire system into a wider angle, it is desirable that the absolute value of $\beta_2$ be as great as possible. However, as $|\beta_2|$ is increased, $e_{4w}$ is decreased and therefore, the value of $\beta_2$ must be limited to a value at which the zoom portion and the relay portion do not mechanically interfere with each other. If the value of the spacing $e_{4w}$ between the zoom portion and the relay portion is of the order of 15, the zoom portion and the relay portion will not mechanically interfere with each other in a practical manner. From this, it is derived that the lateral magnification $\beta_2$ of the second lens group 12 at the change point must satisfy $$-1.35<\beta_2 \quad (7).$$

Figure 4:
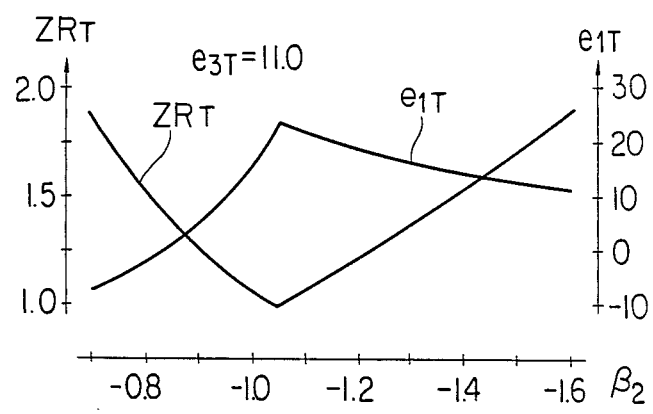

Zooming from the change position to the long focus side will now be considered. At the longest focal distance from III in FIG. 1 and FIG. 2, the spacing $e_{3T}$ between the third lens group 13 and the fourth lens group 14 of the zoom portion becomes minimum and this value determines the telephoto end. Also, at this time, it is necessary that the first lens group 11 which is the focusing portion and the second lens group 12 which is the top group of the zoom portion do not mechanically interfere with each other. By use of the aforementioned numerical values, the value of $e_{3T}$ at the telephoto end is set to 11 (a value which is the limit in the practical manner when the lens is made thick), and with $\beta_2$ as the parameter, the relation between the value $e_{1T}$ of the first lens group 11 and the second lens group 12 at the telephoto end and the zoom ratio $ZR_T$ at the change position and the telephoto end is shown in FIG. 4. The graph shown in FIG. 4, unlike the graph shown in FIG. 3, is of a shape in which both $e_{1T}$ and $ZR_T$ have extreme values, and to achieve as high a magnification as possible, it is necessary that the absolute value of $\beta_2$ be far from 1. However, in order that the focusing portion 11 and the zoom portion 12 may not interfere with each other, it is desirable that $|\beta_2|$ be in the vicinity of about 1.05. As a value which satisfies the condition, there is obtained:

$$-1.3 < \beta_2 < -1.025 \quad (8)$$

From formulas (7) and (8), it is derived that to achieve a wide angle and a high magnification which are the objects of the present invention, it is necessary that $$-1.3 < \beta_2 < -1.025 \quad (9).$$

Figure 5:
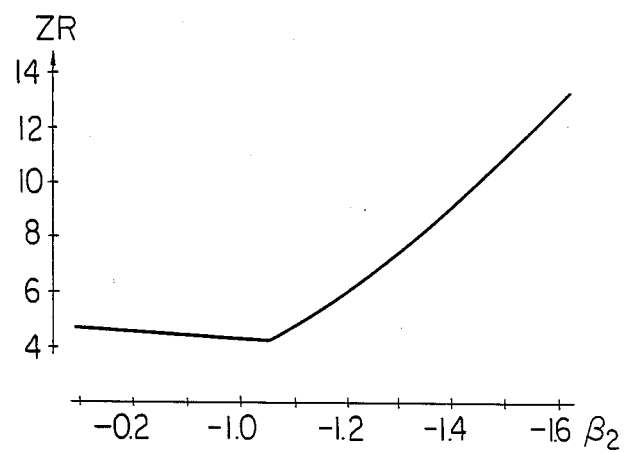

The relation between the zoom ratio ZR of the whole, i.e., the ratio of $ZR_W$ to $ZR_T$, and $\beta_2$ is shown in FIG. 5. From this, it is derived that it is desirable that $\beta_2$ satisfy formula (9) and be a smaller value.

The relay portion 15 may be either positive or negative, but may desirably be positive.

Some embodiments will be shown below.

Figure 6:
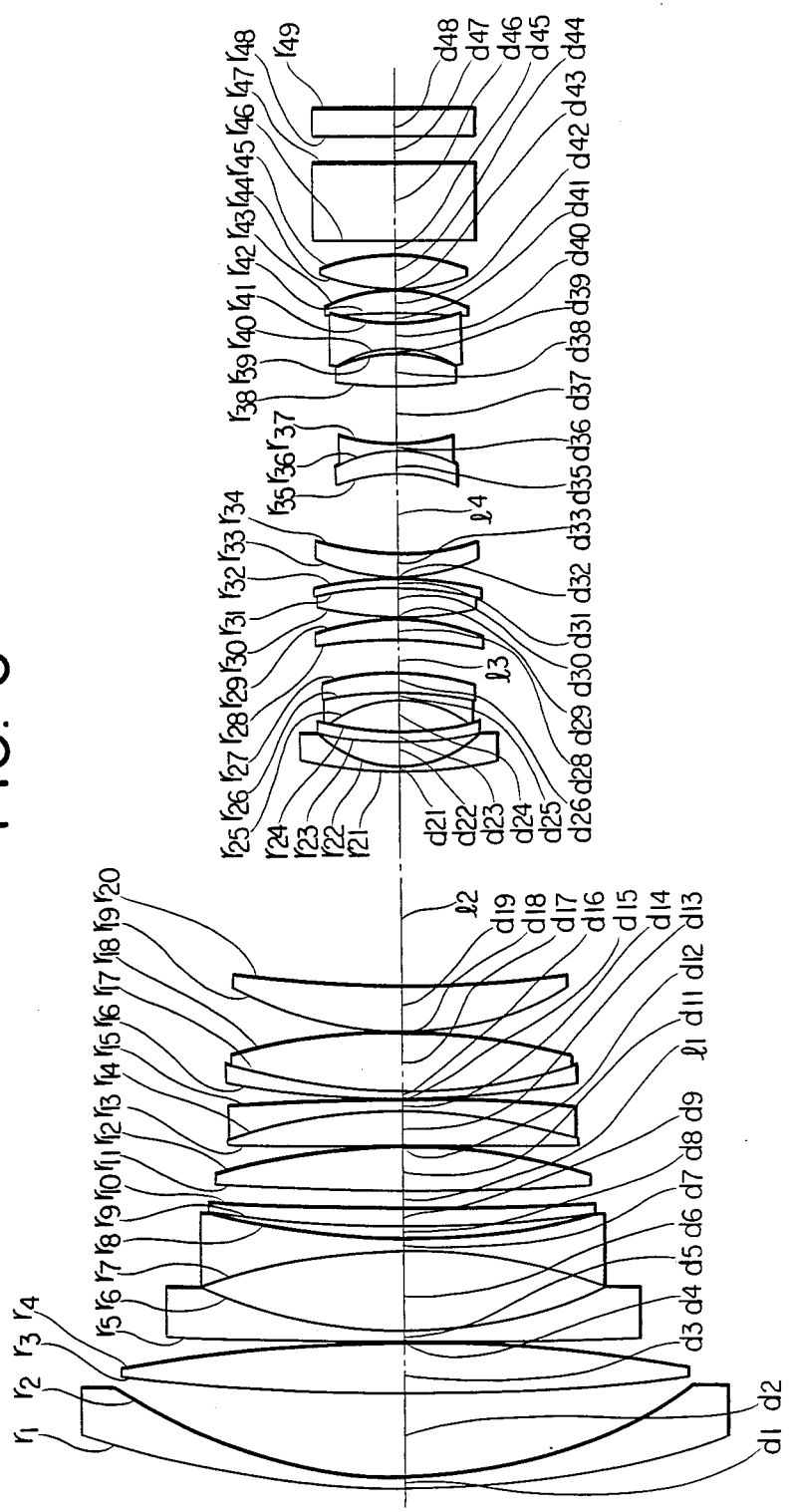
FIG. 6 is a cross-sectional view of a first embodiment of the zoom lens according to the present invention.
Figure 7C:
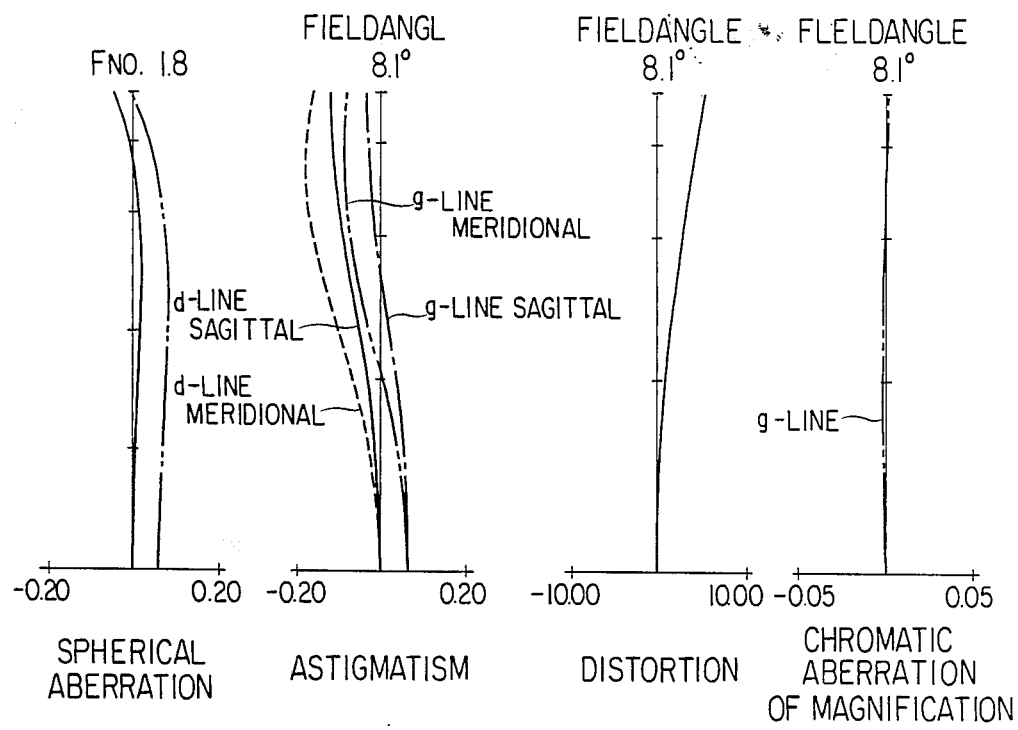

FIG. 6 shows a cross-sectional view of a first embodiment of the zoom lens according to the present invention. The zoom lens shown in FIG. 6 is one having a field angle of 8.26°–16.2° and a wide angle and high magnification amounting to a zoom ratio of 6.2. In this embodiment, the change is effected at $\beta_2 = -1.21$. FIGS. 7A, 7B and 7C show the values aberrations (spherical abberation, astigmatism, distortion and chromatic aberration of magnification) in the zoom lens shown in FIG. 6. FIG. 7A shows the aberrations at the wide angle end, FIG. 7B shows the aberrations at the change point, and FIG. 7C shows the aberrations at the telephoto end. The data of this zoom lens are shown in Table 1 below.

Figure 8:
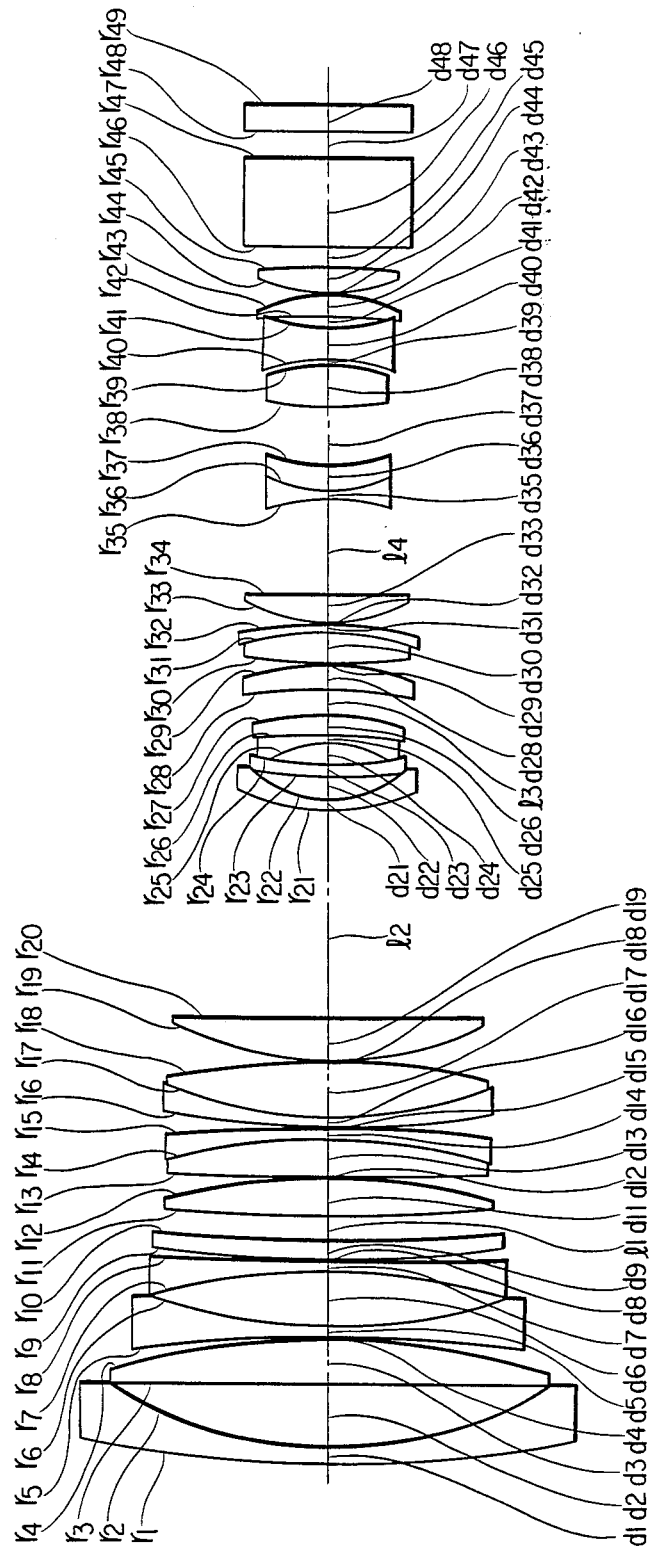
FIG. 8 is a cross-sectional view of a second embodiment of the zoom lens according to the present invention.
Figure 9A:
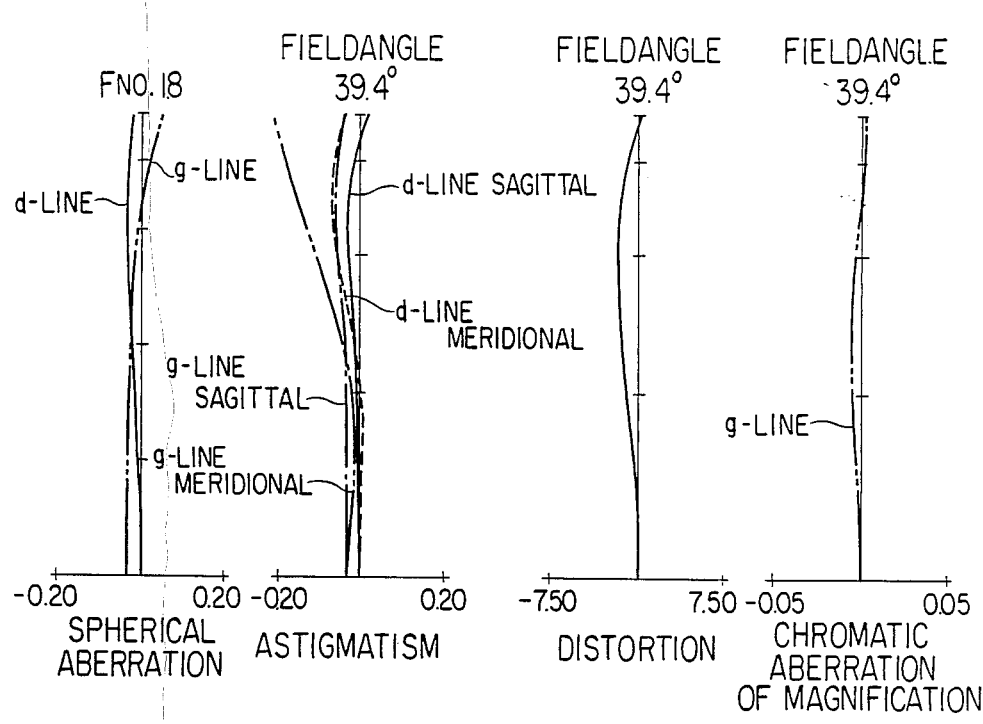
FIGS. 9A, 9B and 9C show the various aberrations in the zoom lens shown in FIG. 8.
Figure 9B:
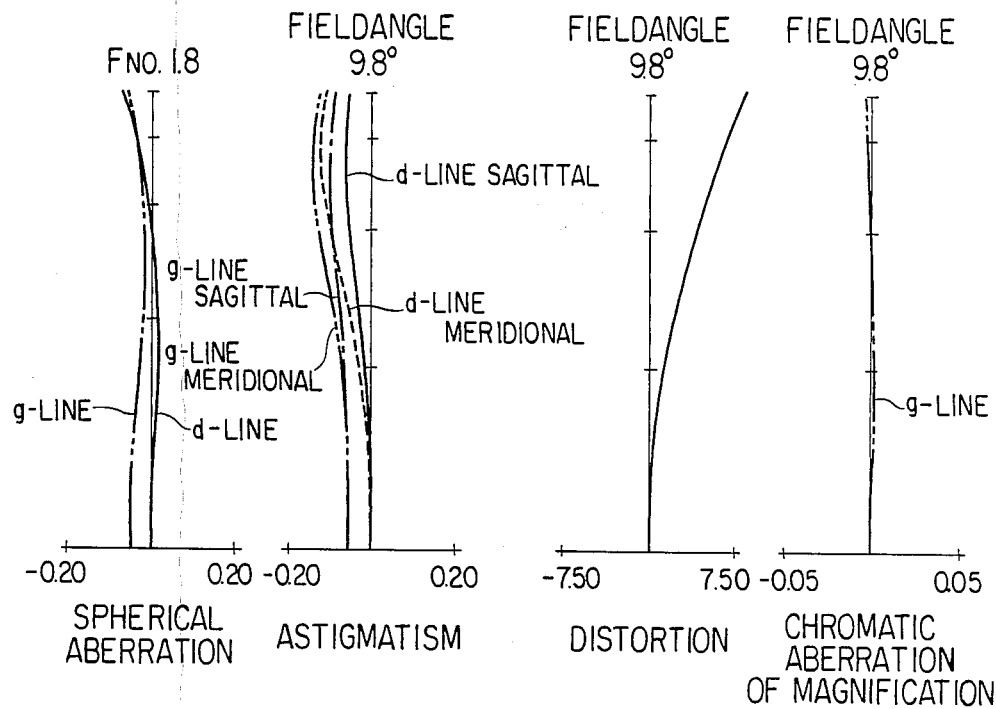
Figure 9C:
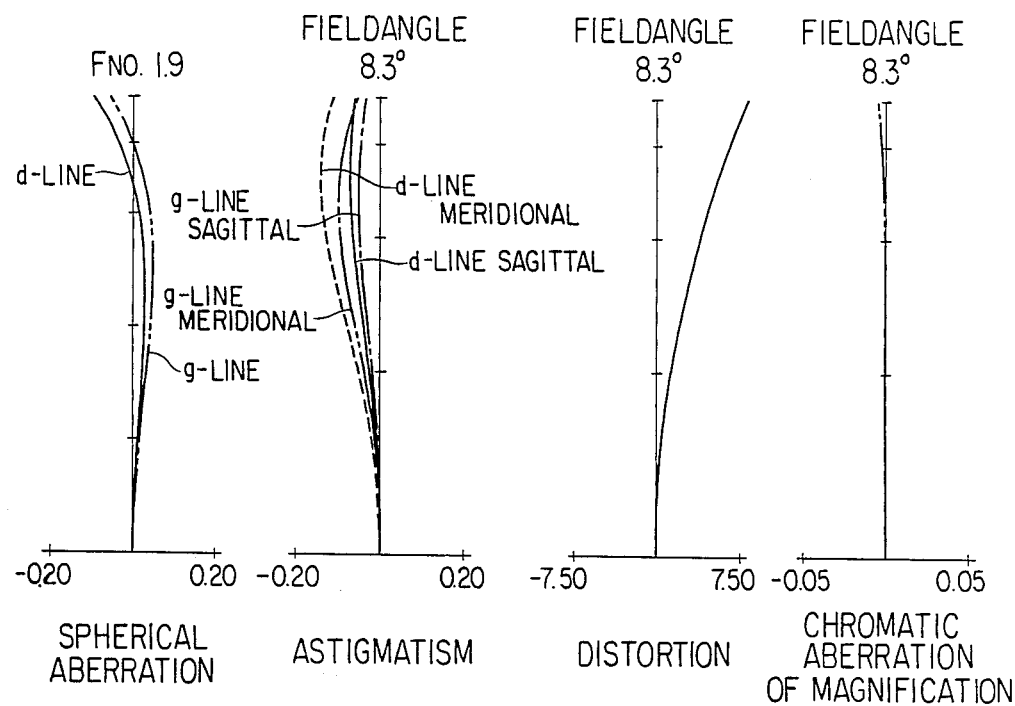

FIG. 8 shows a cross-sectional view of a second embodiment of the zoom lens according to the present invention. The zoom lens shown in FIG. 8 is one having a field angle of 78.8°–19.6° and a zoom ratio of 5.6. In this embodiment, the change is effected at $\beta_2 = -1.15$. FIGS. 9A, 9B and 9C show the various aberrations in the zoom lens shown in FIG. 8. FIG. 9A shows the abberations at the wide angle end, FIG. 9B shows the aberrations at the change point, and FIG. 9C shows the aberrations at the telephoto end. The data of this zoom lens are shown in Table 2 below.

Figure 10:
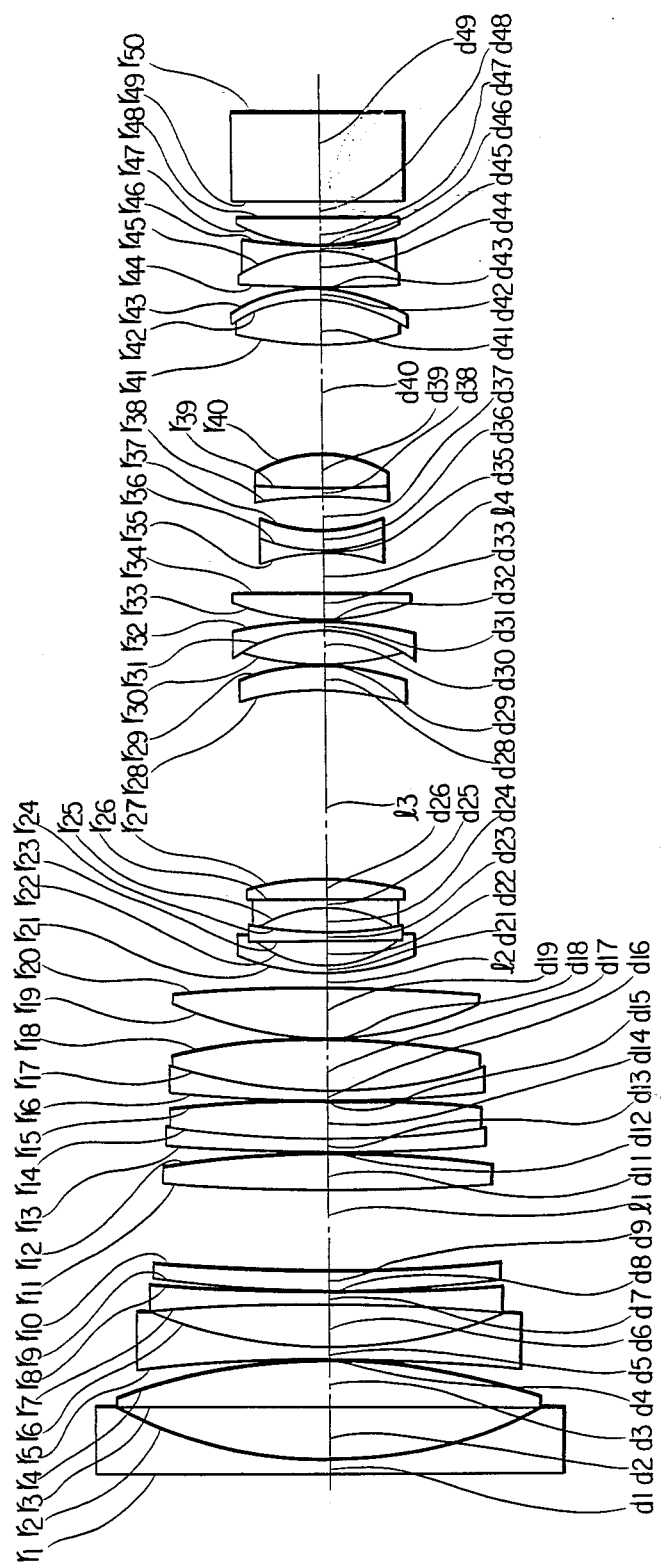
FIG. 10 is a cross-sectional view of a third embodiment of the zoom lens according to the present invention.
Figure 11A:
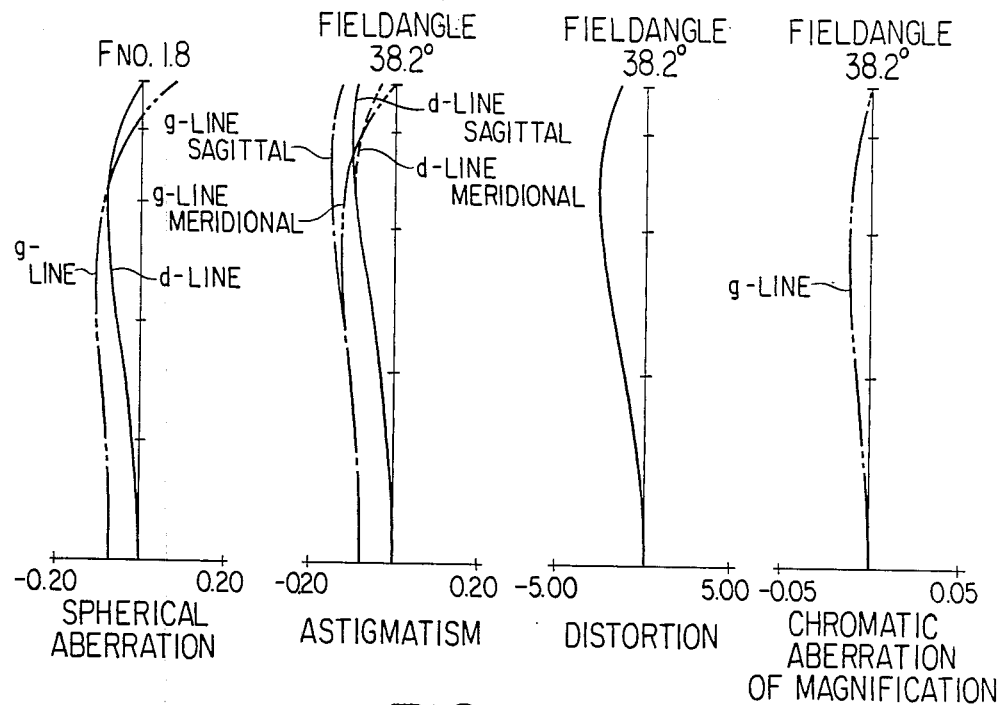
FIGS. 11A and 11B show the various aberrations in the zoom lens shown in FIG. 10.
Figure 11B:
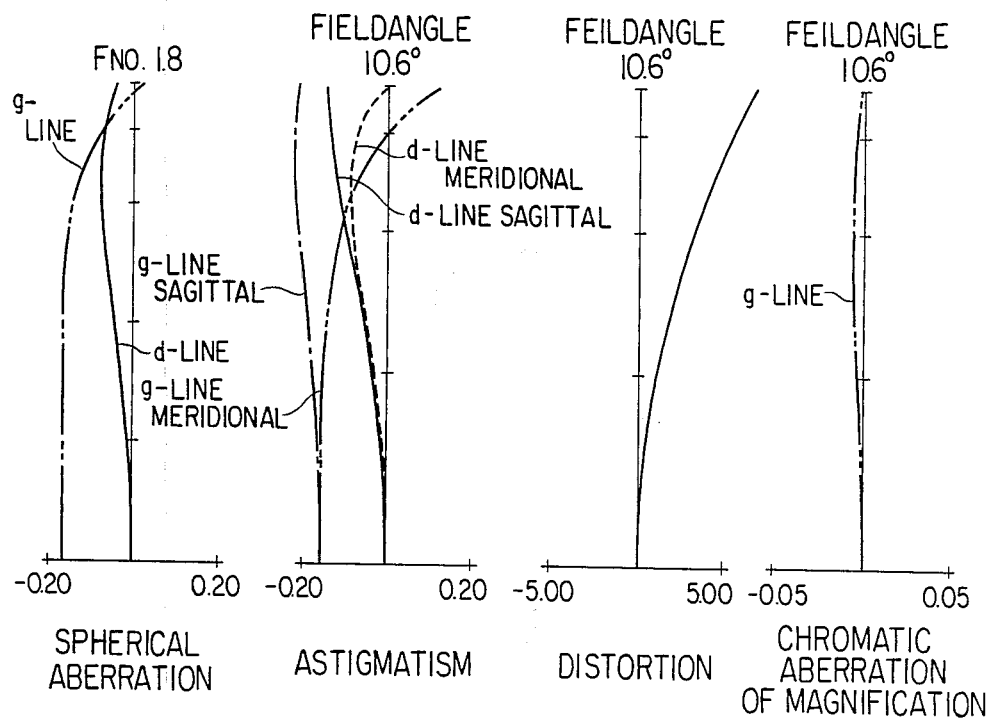

FIG. 10 shows a cross-sectional view of a third embodiment of the zoom lens according to the present invention. The zoom lens shown in FIG. 10 is one having a field angle of 76.4°–21.2° and a zoom ratio of 4.2. In this embodiment, the change is effected at $\beta_2 = -1.025$. FIGS. 11A and 11B show the various aberrations in the zoom lens shown in FIG. 10. FIG. 11A shows the aberrations at the wide angle end, and FIG. 11B shows the aberrations at the telephoto end. The data of this zoom lens are shown in Table 3 below.

In the zoom lenses shown in FIGS. 6, 8 and 10, $r_i$ represents the radius of curvature of the ith surface as counted from the object side, and $d_i$ represents the on-axis thickness or the on-axis air space between the ith surface and the (i+1)th surface. Further, in the tables below, $n_i$ represents the refractive index between the ith surface and the (i+1)th surface, and the value 1.0 indicates the refractive index of the air. $\nu_i$ represents the dispersion.

TABLE 1

| Surface No. | r | d | n | ν |
|---|---|---|---|---|
| 1 | 116.91571 | 1.6000 | 1.804000 | 46.60 |
| 2 | 60.22296 | 10.3000 | 1. | |
| 3 | 270.55848 | 6.4000 | 1.805180 | 25.40 |
| 4 | −180.80755 | 0.1000 | 1. | |
| 5 | 1067.07552 | 1.4000 | 1.640000 | 60.10 |
| 6 | 60.83385 | 10.0000 | 1. | |
| 7 | −63.70580 | 1.3000 | 1.772500 | 49.60 |
| 8 | 92.66526 | 1.5000 | 1. | |
| 9 | 191.42656 | 2.7000 | 1.805180 | 25.40 |
| 10 | 1311.52000 | $l_1$ (variable) | 1. | |
| 11 | 353.93942 | 5.4000 | 1.640000 | 60.10 |
| 12 | −73.36577 | 0.1000 | 1. | |
| 13 | 2684.56570 | 4.4000 | 1.620410 | 60.30 |
| 14 | −58.54192 | 1.2000 | 1.805180 | 25.40 |
| 15 | −454.01265 | 0.1000 | 1. | |
| 16 | 108.09519 | 1.2000 | 1.805180 | 25.40 |
| 17 | 67.62874 | 7.0000 | 1.620410 | 60.30 |
| 18 | −76.43509 | 0.1000 | 1. | |
| 19 | 36.60565 | 6.0000 | 1.640000 | 60.10 |
| 20 | 147.96906 | $l_2$ (variable) | 1. | |
| 21 | 46.79127 | 1.0000 | 1.772500 | 49.60 |
| 22 | 15.00051 | 2.9000 | 1. | |
| 23 | 75.16383 | 0.9000 | 1.772500 | 49.60 |
| 24 | 32.21611 | 3.9000 | 1. | |
| 25 | −14.24608 | 0.9000 | 1.772500 | 49.60 |
| 26 | −45.67613 | 2.6000 | 1.772500 | 21.30 |
| 27 | −24.34330 | $l_3$ (variable) | 1. | |
| 28 | −59.93984 | 2.7000 | 1.487490 | 70.10 |
| 29 | −26.11928 | 0.1000 | 1. | |
| 30 | 35.32509 | 3.8000 | 1.640000 | 60.10 |
| 31 | −33.35128 | 0.7500 | 1.805180 | 25.40 |
| 32 | −47.37306 | 0.1000 | 1. | |
| 33 | 20.46240 | 3.1000 | 1.487490 | 70.10 |
| 34 | 31.02119 | $l_4$ (variable) | 1. | |
| 35 | −24.22774 | 2.9000 | 1.805180 | 25.40 |
| 36 | −14.49257 | 0.8000 | 1.620410 | 60.30 |
| 37 | 50.06844 | 6.7000 | 1. | |
| 38 | 67.97868 | 4.0000 | 1.696800 | 55.50 |
| 39 | −18.02493 | 0.5000 | 1. | |
| 40 | −15.66993 | 3.2000 | 1.805180 | 25.40 |
| 41 | 25.26120 | 1.2000 | 1. | |
| 42 | −72.36821 | 2.7000 | 1.603110 | 60.70 |
| 43 | −17.61951 | 0.1000 | 1. | |
| 44 | 23.11986 | 3.7000 | 1.658300 | 57.30 |
| 45 | −30.66395 | 2.0000 | 1. | |
| 46 | 0.0 | 9.8000 | 1.695000 | 42.20 |
| 47 | 0.0 | 3.0000 | 1. | |
| 48 | 0.0 | 3.0000 | 1.516330 | 64.10 |
| 49 | 0.0 | | 1. | |

| Variable spacing | Focal length | | |
|---|---|---|---|
| | 6.2500 | 31.0925 | 38.6047 |
| $l_1$ | 8.8446 | 1.7993 | 0.6866 |
| $l_2$ | 0.3507 | 26.6507 | 29.8507 |
| $l_3$ | 29.8909 | 3.5909 | 0.3909 |
| $l_4$ | 2.5060 | 9.5713 | 10.6640 |

Back focal length: 3.4008

TABLE 2

| Surface No. | r | d | n | ν |
|---|---|---|---|---|
| 1 | 171.03397 | 1.6000 | 1.804000 | 46.60 |
| 2 | 47.96261 | 7.7000 | 1. | |
| 3 | −1164.06474 | 5.2000 | 1.805180 | 25.40 |
| 4 | −85.80413 | 0.1000 | 1. | |
| 5 | −213.84137 | 1.4000 | 1.640000 | 60.10 |
| 6 | 67.00359 | 6.7000 | 1. | |
| 7 | −70.18565 | 1.3000 | 1.772500 | 49.60 |
| 8 | 1134.03565 | 0.1000 | 1. | |
| 9 | 197.49492 | 2.4000 | 1.805180 | 25.40 |
| 10 | 363.36835 | $l_1$ (variable) | 1. | |
| 11 | 342.68700 | 4.2000 | 1.640000 | 60.10 |
| 12 | −75.31097 | 0.1000 | 1. | |
| 13 | 739.56743 | 4.4000 | 1.620410 | 60.30 |
| 14 | −72.15539 | 1.2000 | 1.805180 | 25.40 |
| 15 | −251.79858 | 0.1000 | 1. | |
| 16 | 119.56022 | 1.2000 | 1.805180 | 25.40 |
| 17 | 50.01014 | 6.2000 | 1.620410 | 60.30 |
| 18 | −111.43727 | 0.1316 | 1. | |

TABLE 2-continued

| Surface No. | r | d | n | ν |
|---|---|---|---|---|
| 19 | 39.42205 | 5.0000 | 1.640000 | 60.10 |
| 20 | 709.95305 | $l_2$ (variable) | 1. | |
| 21 | 24.73822 | 1.0000 | 1.772500 | 49.60 |
| 22 | 13.07289 | 2.9000 | 1. | |
| 23 | 124.95274 | 0.9000 | 1.772500 | 49.60 |
| 24 | 31.74411 | 2.9000 | 1. | |
| 25 | −14.67735 | 0.9000 | 1.772500 | 49.60 |
| 26 | −131.48784 | 2.6000 | 1.922860 | 21.30 |
| 27 | −29.25522 | $l_3$ (variable) | 1. | |
| 28 | −60.48733 | 2.7000 | 1.487490 | 70.10 |
| 29 | −30.76480 | 0.1000 | 1. | |
| 30 | 76.97306 | 3.8000 | 1.640000 | 60.10 |
| 31 | −32.17013 | 0.7500 | 1.805180 | 25.40 |
| 32 | −47.76822 | 0.1000 | 1. | |
| 33 | 20.16241 | 3.1000 | 1.487490 | 70.10 |
| 34 | 346.12909 | $l_4$ (variable) | 1. | |
| 35 | −34.86889 | 0.8100 | 1.620410 | 60.30 |
| 36 | 13.88332 | 3.0000 | 1.805180 | 25.40 |
| 37 | 21.46045 | 6.7000 | 1. | |
| 38 | 49.58193 | 5.0000 | 1.696800 | 55.50 |
| 39 | −19.79218 | 0.5000 | 1. | |
| 40 | −19.73736 | 3.6000 | 1.805180 | 25.40 |
| 41 | 24.82672 | 1.2000 | 1. | |
| 42 | −246.14528 | 2.4300 | 1.603110 | 60.70 |
| 43 | −19.11120 | 0.1000 | 1. | |
| 44 | 22.04760 | 3.2400 | 1.658300 | 57.30 |
| 45 | −50.15705 | 2.0000 | 1. | |
| 46 | 0.0 | 9.8000 | 1.659000 | 42.20 |
| 47 | 0.0 | 3.0000 | 1. | |
| 48 | 0.0 | 3.0000 | 1.516330 | 64.10 |
| 49 | 0.0 | | 1. | |

| Variable spacing | Focal length | | |
|---|---|---|---|
| | 6.7700 | 31.9770 | 37.7514 |
| $l_1$ | 10.1386 | 2.7928 | 1.9015 |
| $l_2$ | 0.3384 | 25.1843 | 27.5755 |
| $l_3$ | 27.6279 | 2.7820 | 0.3908 |
| $l_4$ | 3.5787 | 10.9246 | 11.8158 |
| Back focal length: 4.2591 | | | |

TABLE 3

| Surface No. | r | d | n | ν |
|---|---|---|---|---|
| 1 | −9380.86966 | 1.6000 | 1.804000 | 46.60 |
| 2 | 48.35126 | 6.4000 | 1. | |
| 3 | −1050.86624 | 5.6000 | 1.805180 | 25.40 |
| 4 | −68.75278 | 0.1000 | 1. | |
| 5 | −153.81599 | 1.4000 | 1.640000 | 60.10 |
| 6 | 54.10388 | 5.2000 | 1. | |
| 7 | −164.56624 | 1.3000 | 1.772500 | 49.60 |
| 8 | 457.07330 | 0.1000 | 1. | |
| 9 | 153.89085 | 2.4000 | 1.805180 | 25.40 |
| 10 | 237.65512 | $l_1$ (variable) | 1. | |
| 11 | 478.12195 | 4.2000 | 1.640000 | 60.10 |
| 12 | −111.48144 | 0.1000 | 1. | |
| 13 | 1205.66067 | 1.2000 | 1.805180 | 25.40 |
| 14 | 109.32018 | 4.4000 | 1.620410 | 60.30 |
| 15 | −402.80488 | 0.1000 | 1. | |
| 16 | 211.06669 | 1.2000 | 1.805180 | 25.40 |
| 17 | 54.32187 | 6.2000 | 1.620410 | 60.30 |
| 18 | −78.11129 | 0.1000 | 1. | |
| 19 | 38.01292 | 6.0000 | 1.640000 | 60.10 |
| 20 | −238.69474 | $l_2$ (variable) | 1. | |
| 21 | 24.90822 | 1.0000 | 1.772500 | 49.60 |
| 22 | 13.09838 | 2.9000 | 1. | |
| 23 | 249.88467 | 0.9000 | 1.772500 | 49.60 |
| 24 | 38.97292 | 2.9000 | 1. | |
| 25 | −14.72044 | 0.9000 | 1.772500 | 49.60 |
| 26 | 200.62033 | 2.6000 | 1.922860 | 21.30 |
| 27 | −32.01625 | $l_3$ (variable) | 1. | |
| 28 | −32.10635 | 2.7000 | 1.487490 | 70.10 |
| 29 | −27.55810 | 0.1000 | 1. | |
| 30 | 41.00716 | 4.5000 | 1.640000 | 60.10 |
| 31 | −15.23632 | 0.7500 | 1.805180 | 25.40 |
| 32 | −35.70370 | 0.1000 | 1. | |
| 33 | 28.16077 | 3.1000 | 1.487490 | 70.10 |
| 34 | −147.83645 | $l_4$ (variable) | 1. | |
| 35 | −26.70816 | 0.6000 | 1.651600 | 58.60 |
| 36 | 18.83522 | 2.1000 | 1.698950 | 30.10 |
| 37 | 21.08466 | 4.0000 | 1. | |
| 38 | −36.39036 | 0.7000 | 1.640000 | 60.10 |
| 39 | 269.39655 | 3.6000 | 1.698950 | 30.10 |
| 40 | −17.26672 | 13.0000 | 1. | |
| 41 | 31.35470 | 5.2000 | 1.487490 | 70.10 |
| 42 | −16.41890 | 1.0000 | 1.755200 | 27.50 |
| 43 | −20.85642 | 0.1000 | 1. | |
| 44 | 145.33187 | 4.2000 | 1.516330 | 64.10 |
| 45 | −15.91496 | 0.8000 | 1.755200 | 27.50 |
| 46 | 137.89299 | 0.1000 | 1. | |
| 47 | 19.60462 | 2.7000 | 1.487490 | 70.10 |
| 48 | 186.30884 | 2.0000 | 1. | |
| 49 | 0.0 | 10.0000 | 1.695000 | 42.20 |
| 50 | 0.0 | | 1. | |

| Variable spacing | Focal length | |
|---|---|---|
| | 7.0000 | 29.4569 |
| $l_1$ | 9.6788 | 2.0483 |
| $l_2$ | 1.7540 | 23.2540 |
| $l_3$ | 21.8251 | 0.3251 |
| $l_4$ | 4.1628 | 11.7933 |
| Back focal length: 4.1453 | | |

What I claim is:

1. A zoom lens comprising, in succession from the object side to the image side, a positive first lens group movable for focusing, a negative second lens group movable for zooming, a positive third lens group movable for zooming, a negative fourth lens group movable for zooming and moved with said second lens group, and a stationary fifth lens group, and wherein when $\beta_i$ is the lateral magnification of the ith lens group as counted from the object side, the lateral magnification of each of said lens groups satisfies at a point in zooming of zooming integral curves $$\beta_2 < 0, \beta_4 < 0, \beta_2\beta_4 = 1, \beta_3 = -1$$

and satisfies at said point $$-1.3 < \beta_2 < -1.025.$$

2. A zoom lens according to claim 1, wherein said point in zooming is a position at which zooming integral curves intersect each other, said second and fourth lens groups being moved along one of said zooming integral curves.

3. A zoom lens according to claim 1, wherein the direction of movement of said second lens group and said fourth lens group and the direction of movement of said third lens group are opposite to each other.

* * * * *